United States Patent [19]

Wood

[11] 4,320,911
[45] Mar. 23, 1982

[54] HIGH TEMPERATURE PENETRATOR ASSEMBLY WITH BAYONET PLUG AND RAMP-ACTIVATED LOCK

[75] Inventor: Kenneth E. Wood, Long Beach, Calif.

[73] Assignee: The United States of America as represented by the Administrator of the National Aeronautics and Space Administration, Washington, D.C.

[21] Appl. No.: 119,335

[22] Filed: Feb. 7, 1980

[51] Int. Cl.³ .............................................. F16L 41/00
[52] U.S. Cl. ..................................... 285/89; 285/159; 285/401; 403/315
[58] Field of Search ................. 285/89, 401, 402, 376, 285/159, 205, 206, 209, 80; 403/315

[56] References Cited

U.S. PATENT DOCUMENTS

| | | | |
|---|---|---|---|
| 794,539 | 7/1905 | O'Brien | 285/89 |
| 1,232,193 | 7/1917 | Bowes, Jr. | 285/376 |
| 1,372,238 | 3/1921 | Kreiter | 285/89 |
| 2,299,183 | 10/1942 | Shanor | 285/80 X |
| 3,608,933 | 9/1971 | Lee | 285/89 X |
| 3,889,046 | 6/1975 | Oberdiear | 285/178 X |

FOREIGN PATENT DOCUMENTS

| | | | |
|---|---|---|---|
| 347703 | 4/1931 | United Kingdom | 285/89 |
| 642567 | 1/1979 | U.S.S.R. | 285/89 |

Primary Examiner—Thomas F. Callaghan
Attorney, Agent, or Firm—Edward K. Fein; John R. Manning; Marvin F. Matthews

[57] ABSTRACT

Penetration apparatus, for very high temperature applications in which a base plug (12) is inserted into an opening through a bulkhead (11), the base plug (12) having a head shape (14b) seating against the highest temperature surface (11a) of the bulkhead, which may be the skin of the nose cone or other part of a space vehicle intended for nondestructive atmospheric reentry. From the second side of the bulkhead (11b) at which the less severe environment is extant, a bayonet plug (14) is inserted into the base plug and engages an internal shoulder (19) therein upon 90° rotation. The bayonet plug (14) has an integral flanged portion (14a) and a pair of ramping washers (16 and 17) are located between the flange (14a) and the second bulkhead surface (11b) with a spacing washer (15) as necessary. Rotation of one ramping washer with respect to the other provides an axial tensile force between the bayonet plug (14) and the base plug (12) to lock the assembly in place without the use of threads or other easily oxidized shapes. Columbia base metal is employed with silicide coating, and provision is made for safety wiring (20) of the ramping washers (16 and 17) against unintended rotation in place.

10 Claims, 6 Drawing Figures

HIGH TEMPERATURE PENETRATOR ASSEMBLY WITH BAYONET PLUG AND RAMP-ACTIVATED LOCK

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

DESCRIPTION

1. Technical Field

The invention relates generally to penetrators operative though a wall or bulkhead, one surface of which is subject to very high temperatures. A high temperature, pressure probe, orifice installation for a space vehicle is a particular apparatus to which the invention relates.

In the very high temperature field of interest, well-known locking structures involving complex shapes such as springs and screw threading are unsuitable even when exotic base materials, such as columbium are employed with silicide coating. The silicide coating tends to crack, permitting oxidation of the threaded surfaces and subsequent failure.

2. Background Art

The prior art discloses various feed-through and penetrator arrangements for high temperature operation and even in radioactive and high pressure environments.

U.S. Pat. No. 3,694,052 describes a bayonet locked coupling with spring biasing to facilitate stability of the lock, an arrangement not suitable for very high temperatures in view of its structure, including springs. No employment of the unique combination of the invention including the ramping washers taken with the bayonet structure is found.

U.S. Pat. Nos. 3,889,046 and 3,333,501 employ eccentric washers but do not disclose ramping washers or a bayonet engagement.

No reference is known which discloses the unique and cooperative bayonet and ramping washer combination of the invention, and no combination appears to suggest itself from known references which would render the invention an obvious combination of known factors and structure.

The manner in which the invention provides a unique combination particularly advantageous in very high temperature conditions, such as encountered in space vehicle atmospheric reentry, will be understood as this description proceeds.

DISCLOSURE OF THE INVENTION

In consideration of the limitations and disadvantages of the prior art, it may be said to have been the general objective of the invention to provide a penetrator assembly particularly adapted to the very high temperature environment described herein.

The apparatus of the invention is particularly useful in very high temperature penetrator assembly. One such penetrator application is in a pressure probe orifice in a space craft adapted for non-destructive atmospheric reentry.

A base plug having a head portion and a stem portion is inserted into an opening through a bulkhead. A bayonet plug has a stem with a bayonet head at an extremity thereof, which is inserted into an axial keyway in a central cavity in the base plug stem portion and turned 90°+ to engage an internal shoulder in the base plug. A flange, integral with the bayonet plug stem bears against a pair of ramping washers which, when rotated with respect to each other produce an axial tension locking the bayonet plug in place. The ramping washers are in compression between the bayonet plug flange and the bulkhead surface opposite that engaged by the head portion of the base plug. A spacing washer is also ordinarily required.

BRIEF DESCRIPTION OF THE DRAWINGS

The details of my invention will be described in connection with the accompanying drawing, in which.

BEST MODE FOR CARRYING OUT THE INVENTION

Figure 1:
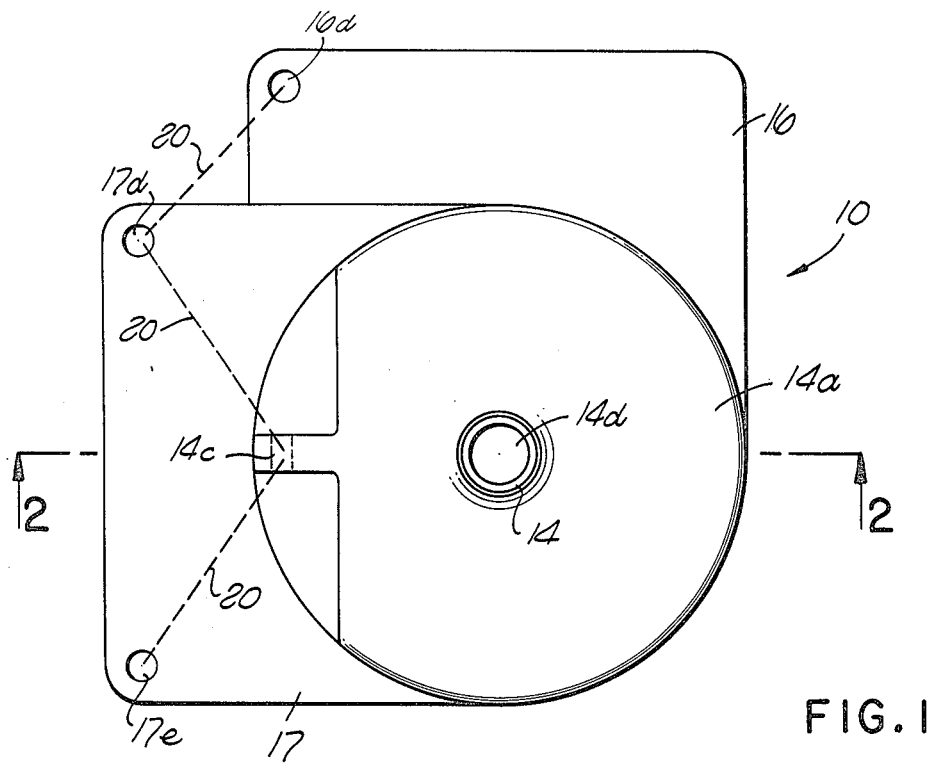
FIG. 1 is an assembled view of the apparatus of the invention from one side of the bulkhead.
Figure 2:
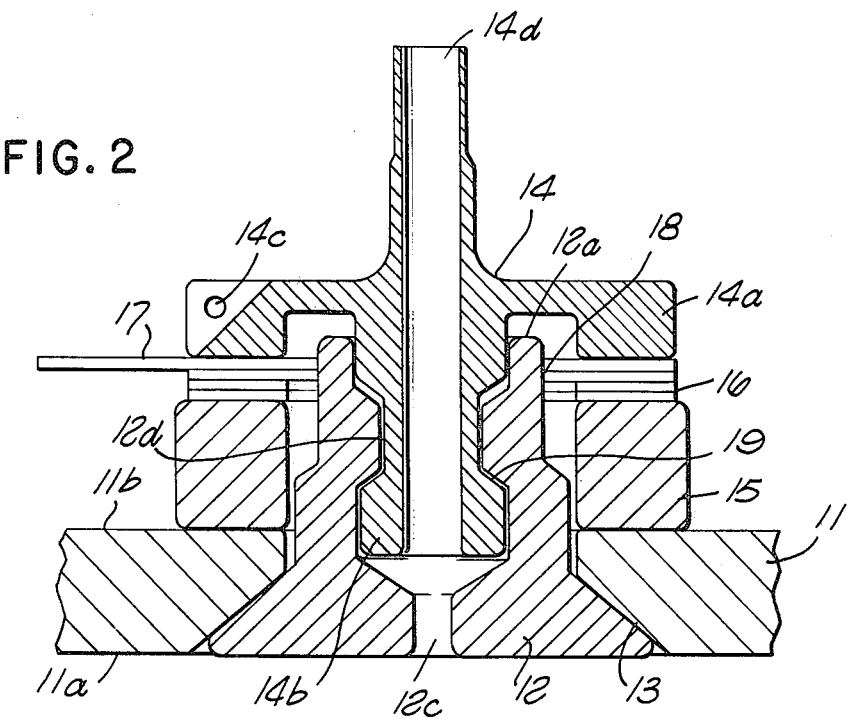
FIG. 2 is a sectional view of the assembly of FIG. 1 taken as indicated.

Referring now to FIGS. 1 and 2 together, the assembled view of the invention, generally at 10, in FIG. 1 will be better understood from contemporaneous consideration of FIG. 2. A bulkhead member 11 will be understood to separate a hostile environment from a relatively benign environment. In the spacecraft application of the invention, it has been noted that the invention is particularly useful to provide a pressure probe orifice installation. Whatever use is made of the passage defined by 14a and 14d in FIG. 2 is not basically a part of the invention. In the space vehicle application, the "skin" 11 may be that of a nose cone or similar part, and surface 11a is exposed to the space environment including atmospheric reentry, during which time temperatures at surface 11a reach levels up to 2600° F. (1427° Celsius) or more. Such temperature technology and suitable materials will be identified as this description proceeds.

The penetrator assembly basically comprises base plug 12, bayonet plug 14, ramping washers 16 and 17 and a spacing washer 15. The spacing washer 15 will be seen not to be an absolutely necessary part of the combination, however. If the dimension and configuration of the combination in the axial coordinate (normal to skin 11) is slightly modified, the lower ramping washer can bear directly on the surface 11b. The spacing washer is a mechanical and assembly advantage, however, as will be realized as this description proceeds.

Figure 5:
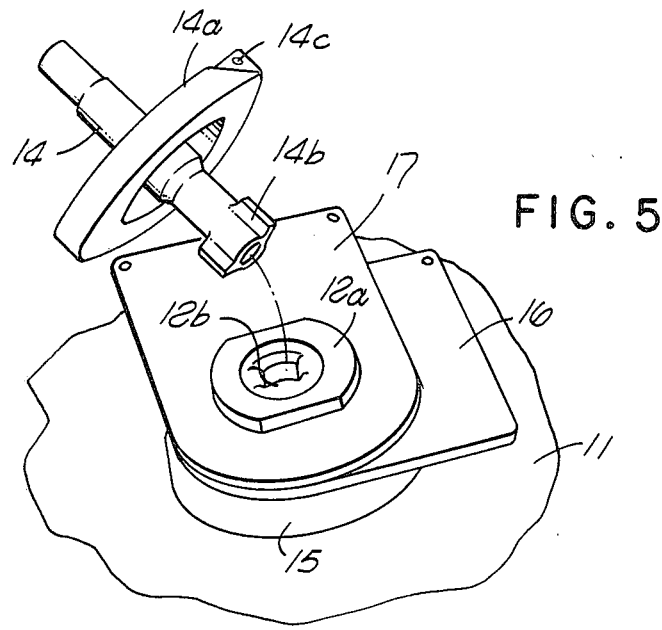
FIG. 5 is a partially exploded pictorial view showing assembly relationships of the apparatus of FIGS. 1 and 2.

A central cavity of keyway 12b in the stem end 12a of the base plug 12 is shaped as an elongated cross-section as shown, the exact shape being subject to design variation. The shape of cavity 12b illustrated in FIG. 5 is typical of bayonet engagement devices, the fit provided affording easy insertion of the bayonet plug 14 in the manner pictorial presented in FIG. 5.

The stem of the bayonet plug 14 extends axially and the head portion 14b engages the internal shoulder 19 in base plug 12 when turned approximately 90° after insertion in base plug 12. In FIG. 2, the head portion 14b is shown turned and so engages against shoulder 19.

Before the rotation of bayonet plug 14, the narrow cross-sectional dimension of head 14b would show in FIG. 2, that narrow portion having a dimension slip fitting through neck 12d in base plug 12. The bayonet plug 14 cross-section at head 14b may be shaped to fit in the central cavity of base plug 12 adjacent its end 12a by counterboring 12 to a nominal depth to accommodate this larger cross-section; however, this is a more or less optional design feature suggested by FIG. 2 but omitted in FIG. 5.

The bayonet plug 14 has an integral flange 14a with annular bearing surfaces against the flat surface of upper ramping washer 17. This flange 14a also has a safety wire "ear" 14c, the purpose of which will be evident hereinafter.

Figure 3:
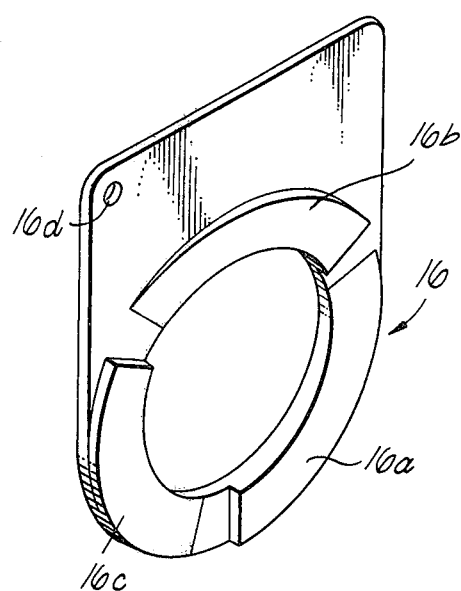
FIG. 3 is a pictorial view of one of the ramping washers of FIGS. 1 and 2.
Figure 4:
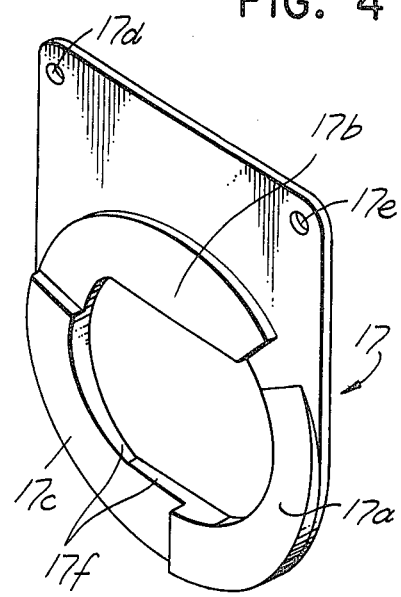
FIG. 4 is a pictorial view of the keyed ramping washer of FIGS. 1 and 2.

Referring now also to FIGS. 3 and 4, the lower and upper ramping washers of FIGS. 2 and 5, respectively, it will be noted that ramping washer 17 has three separate annular ramp surfaces 17a, 17b and 17c and a flange having safety wire attachment holes 17d and 17e. Still further, ramping washer 17 has a keying shape, illustrated at 17f on FIG. 4, which matches the shape of the base plug 12 stem at 18 (FIG. 2). This rotationally locks ramping washer 17 to the base plug 12.

In FIG. 3, ramping washer 16 is shown with three annular ramp faces 16a, 16b and 16c, which match ramps 17a, 17b and 17c when ramping washers 16 and 17 are emplaced (ramp face to ramp face) as indicated on FIG. 2. Thus, rotation of one ramping washer with respect to the other is translated into axial motion, i.e., the effective thickness of the ramping washer pair is a function of their rotational relationship.

It will be particularly noted that, with the multiple ramp configurations of FIGS. 3 and 4, the axial forces generated are uniformly distributed circumferentially. This would not be the case with a single slope ramp surface. Such a uniform locking force distribution is particularly advantageous in the spacecraft application aforementioned. The spacecraft skin surfaces to which the locking forces are ultimately applied are normally coated with glass-like protective coatings which are subject to cracking and crazing particularly if heavily paint loaded. The silicide coating applied to columbium base material hereinbefore mentioned is such a glass-like material.

It will be realized that either one of the ramping washers could provide the base plug stem locking feature, i.e., either one could have shape 17f, but, of course, not both, the one not having this shape being the rotationally positionable one (such as indicated for ramping washer 16 in FIG. 3).

In FIGS. 1 and 2, a central bore in 14 at 14d along with orifice 12c in base plug 12 provide a pressure sensing orifice, particularly useful for the spacecraft application of the invention, however the size and shape of this central axial passage may be varied, or even omitted altogether for other applications.

Figure 6:
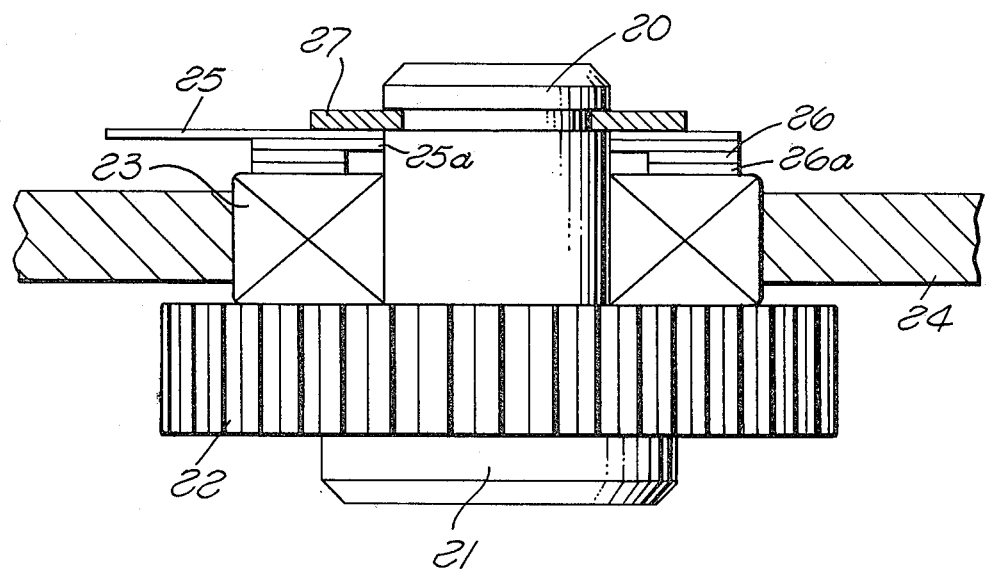
FIG. 6 is an illustration of a machine application of the invention for securing a gear to its shaft.

Referring now to FIG. 6, the concepts of the invention are shown applied to secure a gear 22 to a stub shaft 20 having a head portion 21. The diameter of the central mounting bore of gear 22 normally slip fits over shaft 20 and the gear 22 lies hard against the head 21. Such a gear may, for example, be mounted into a housing having a wall 24, into which a ball, roller or other bearing 23 is inserted. Two pairs of ramping washers are shown in this application. The lower pair includes 26 and 26a and the upper pair includes 25 and 25a. Employment of two pairs of locking washers increases the axial "take-up" range and permits loosening of manufacturing tolerances. The ramp washer pairs thus shown are preferably each comprised of a washer essentially as shown in FIG. 3 and another according to FIG. 4, although variations hereinbefore mentioned can obviously be invoked.

A conventional snap ring 27 serves to hold the assembly comprising gear 22, bearing 23, and the ramping washers 26, 26a, 25 and 25a in place in axial compression against stub shaft head 21.

Obviously, a multiple ramping washer arrangement as shown in FIG. 6 could be applied to the arrangements basically shown in FIGS. 2 and 5.

Materials, per se, are not a part of the novelty of this invention except that the previously mentioned columbium base material with silicide coating as known in the very high temperature materials technology, has been used in the spacecraft application.

In FIG. 1, the safety wire 20 provides rotational stabilization of the bayonet plug 14 and ramping washer 16 with respect to the ramping washer 17, the latter being keyed to base plug 12 as previously indicated. The safety wire is placed on the side of skin 11 which is subject to the least severe temperature stress and therefore is not as subject to heat deterioration as the base plug and bayonet plug, but nevertheless, in some applications must withstand the heat transferred to it by the mass heating to which the assembly as a whole is subjected in the spacecraft application, for example.

If a flush face at and adjacent to skin surface 11a is not required, then obviously a round head on the base plug could be substituted for the conical interface and countersunk shape at 13. For that alternative base plug head shape, the opening in the skin 11 would obviously be a straight-sided hole of uniform cross-section.

Other variations and modifications will suggest themselves to those of skill in this art, once the nature of the invention is understood. For example, more than three annular ramp surfaces on the ramping washers could be provided and the slopes of these ramps can be more or less than suggested in the figures. In fact, as few as one continuous annular ramp surface, with a step break at one angular point, of course, could be employed. The number of annular ramp surfaces and their slopes relates to the rotational to axial transfer characteristic. That is, the axial compression force generated by the ramp washers per degree of angular rotation of these ramping washers with respect to each other is related to those design factors. The three ramp surfaces per washer provides a desirable relationship, however.

It will be noted that the axial compression generated in the ramping washers 16 and 17 is transferred to tensile force holding the interface 19 as well as the interface 13 tightly.

Other variations in shape and relative sizes are obviously possible, especially to fit applications other than the spacecraft application for which the invention was specifically developed. Accordingly, the invention should not be regarded as limited to the specific embodiment illustrated and described.

I claim:

1. Apparatus for effecting a penetration through a bulkhead or the like, said bulkhead being subject to high temperature environment on one surface thereof, comprising:

a bore through said bulkhead countersunk from a first surface thereof;

a base plug having a conical shaped portion from a first end thereof inserted from said bulkhead first surface, said conical shaped substantially matching said countersunk portion of said bulkhead bore and fitted therein;

a central cavity extending through said base plug generally axially and having a centerline normal to the plane of a surface of said bulkhead, said cavity having a cross-sectional shape elongated in a plane parallel to a surface of said bulkhead;

a bayonet plug comprising an elongated generally tubular portion having a bayonet head of cross-section substantially that of said base plug central cavity cross-section but affording an axial fit into said cavity in a first angular orientation;

means within said base plug cavity comprising an internal shoulder such that said bayonet head engages said shoulder in a second angular orientation of said bayonet plug;

a flange portion integral with said tubular portion of said bayonet plug and axially spaced therefrom;

a spacing washer substantially concentric with said base plug and placed against the second surface of said bulkhead; and first and second ramping washers each having at least one arcuate inclined plane on one surface thereof, said ramping washers being placed substantially concentric with said bayonet plug tubular portion, between said spacing washer and said flange portion of said bayonet plug with said arcuate inclined planes facing each other, the axial dimensions with said apparatus being such that, when said bayonet plug is in place within said base plug cavity in said second angular orientation, relative rotation of said ramping washers produces axial locking of said bayonet plug in place.

2. Apparatus according to claim 1 in which said ramping washers are further defined as having three arcuate inclined planes on their facing surfaces.

3. Apparatus according to claim 2 in which said arcuate inclined planes extend over substantially equal arcs each less than 120°.

4. Apparatus according to claim 1 in which said second angular orientation of said bayonet plug is substantially 90° with respect to said first angular orientation.

5. Apparatus according to claim 1 in which said ramping washers have at least partially laterally extended cross-sectional shapes in planes parallel to a surface of said bulkhead to provide means for attaching safety wire to stabilize the rotational positions of said ramping washers.

6. Apparatus according to claim 1 in which said base plug has a generally tubular axial portion perpendicular to a surface of said bulkhead extending at least to an axial dimension beyond the axial location of said ramping washers, said ramping washers having an internal diameter fitting over the corresponding outside diameter of said base plug, one of said ramping washers being keyed to said generally tubular portion of said tubular axial portion of said base plug.

7. Apparatus according to claim 1 in which said bayonet plug and said base plug have mutually coaxial internal bores extending axially perpendicular to a surface of said bulkhead.

8. Apparatus according to claim 6 in which said bayonet plug and said base plug have bores aligned about the axial centerline of said apparatus perpendicular to a surface of said bulkhead, for providing instrument access therethrough.

9. Apparatus according to claim 5 in which said flange portion of said bayonet plug includes means for attaching safety wire thereto, as well as to said ramping washers thereby to rotationally stabilize said ramping washers with respect to said bayonet plug.

10. In a bayonet plug structure in which a bayonet plug having a bayonet head is inserted axially through an axial keyway in a first end of a base plug and rotated substantially a quarter turn to engage an internal shoulder within said base plug to anchor said bayonet plug to said base plug against axial separation force, apparatus for axially locking said structure without the use of threaded engagements, or springs the combination comprising:

a flange on said bayonet plug spaced axially from said bayonet head and integral with the body of said bayonet plug, said flange facing said base plug first end and producing a generally annular gap therebetween; and means comprising a pair of washers rotatable with respect to each other and having ramped facing surface, said washers being placed in said annular gap such that relative rotation of said washers increases their axial thickness to provide locking action between said bayonet plug and said base plug.

* * * * *